US008134768B2

(12) United States Patent
Ide

(10) Patent No.: US 8,134,768 B2
(45) Date of Patent: Mar. 13, 2012

(54) LIGHT ADJUSTING APPARATUS

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/182,751

(22) Filed: Jul. 14, 2011

(65) Prior Publication Data

US 2011/0267669 A1    Nov. 3, 2011

Related U.S. Application Data

(63) Continuation of application No. PCT/JP2010/050275, filed on Jan. 13, 2010.

(30) Foreign Application Priority Data

Jan. 16, 2009  (JP) ................................. 2009-007269
Jan. 8, 2010   (JP) ................................. 2010-003019

(51) Int. Cl.
    *G02B 26/02*       (2006.01)
(52) U.S. Cl. ....................................................... 359/234
(58) Field of Classification Search .................. 359/227, 359/232–234, 236
    See application file for complete search history.

(56) References Cited

U.S. PATENT DOCUMENTS

| 5,926,663 | A  | * | 7/1999 | Suzuki | ........................ | 396/449 |
| 7,832,950 | B2 | * | 11/2010 | Ide | ................................ | 396/510 |
| 2006/0033974 | A1 | * | 2/2006 | Sato | ............................. | 359/227 |
| 2008/0199177 | A1 |   | 8/2008 | Ide | | |

FOREIGN PATENT DOCUMENTS

| JP | HEI 09-281553 | 10/1997 |
| JP | HEI 10-016620 | 1/1998 |
| JP | HEI 10-020360 | 1/1998 |
| JP | 2004-125949 | 4/2004 |
| JP | 2004-191689 | 7/2004 |
| JP | 2005-106969 | 1/2005 |
| JP | 2005-195675 | 7/2005 |
| JP | 2005-300846 | 10/2005 |
| JP | 2008-203601 | 9/2008 |
| JP | 3146954 | 11/2008 |
| JP | 2008-292869 | 12/2008 |
| JP | 2009-062084 | 3/2009 |
| WO | WO 2005/036251 A1 | 4/2005 |

OTHER PUBLICATIONS

International Preliminary Report on Patentability and the Written Opinion PCT/JP2010/050275 dated Aug. 25, 2011 together with the English translation.
International Search Report dated Jul. 22, 2010 issued in PCT/JP2010/050275.

* cited by examiner

*Primary Examiner* — Euncha Cherry
(74) *Attorney, Agent, or Firm* — Scully, Scott, Murphy & Presser, P.C.

(57) ABSTRACT

A light adjusting apparatus for use with a small-size image pickup equipment. The light adjusting apparatus includes two substrates, out of which, one has an aperture, a spacing portion which regulates a distance between the two substrates, at least one incident-light adjusting unit which has a shaft member which becomes a center of rotation, and which is turned in a plane perpendicular to an optical axial direction, between the substrates, and at least one driving unit which drives the incident-light adjusting unit. Incident light which passes through the aperture is adjusted by turning the incident-light adjusting unit alternately, to the aperture and to a retracted position which is retracted from the aperture, by the driving unit. The light adjusting apparatus includes a notch which receives the shaft member, formed in the substrate, and a retaining portion which prevents the incident-light adjusting unit from dropping.

18 Claims, 10 Drawing Sheets

LIGHT ADJUSTING APPARATUS

CROSS-REFERENCE TO RELATED APPLICATIONS

The present application is based upon and claims the benefit of priority under 35 USC 119 from the prior Japanese Patent Application No. 2010-3019 filed on Jan. 8, 2010 and Japanese Patent Application No. 2009-7269 filed on Jan. 16, 2009; the entire contents of both prior Japanese applications are incorporated herein by reference.

BACKGROUND OF THE INVENTION

1. Field of the Invention

The present invention relates to a light adjusting apparatus.

2. Description of the Related Art

Various types of light adjusting apparatus have hitherto been used. As one of the types of such apparatuses, a plug-in type light adjusting apparatus in which, a single or a plurality of optical elements is displaced mutually in and outside an optical path by an electromagnetic driving source or some other type of driving source, and optical characteristics of incident light which passes through the optical path are changed, is available. In recent years, with an achievement of a high-quality image of a portable equipment having an image pickup function and a small-size image pickup equipment such as a micro video scope, with regard to optical elements such as a lens, an aperture, and an optical filter, an application of a focusing lens, a variable aperture, and a variable special characteristic filter instead of a conventional fixed focusing lens, a fixed aperture stop, and a fixed special characteristic filter has been sought strongly. As the abovementioned light adjusting apparatus to be used in such small-size image pickup equipment, such plug-in type light adjusting apparatus which is suitable for small-sizing has been gathering attention because of its simple structure.

As an example of such plug-in type light adjusting apparatus suitable for small-sizing, a light adjusting apparatus disclosed in Japanese Patent Application Laid-open Publication No. Hei 10-20360 is available. This light adjusting apparatus includes a rotor which is polarized to bipolarity. A diaphragm plate is fixed to the rotor via a shaft. The rotor is inserted through a rotating hole into a coil which has been formed to be ring-shaped, and is fixed to be freely rotatable, by a shaft receiver made of a circular cylindrical shaped protruding portion which is formed in an upper cover and a lower cover.

SUMMARY OF THE INVENTION

As it has been described above, in the conventional light adjusting apparatus described in Japanese Patent Application Laid-open Publication No. Hei 10-20360, the shaft which becomes a rotating shaft of the diaphragm plate is fixed to be rotated freely by inserting into the shaft receiver which is made of the circular cylindrical shaped protruding portion formed in the upper cover and the lower cover. Therefore, as a process of assembling the light adjusting apparatus, the upper cover and the lower cover have to be joined with the shaft positioned in the shaft receiver. In an apparatus in which, the small-sizing has been sought, due to the positioning of the shaft; a degree of difficulty of assembling becomes high.

In Japanese Patent Application Laid-open Publication No. Hei 10-20360, as the shaft receiver, the circular cylindrical shaped protruding portion has been formed in the upper cover and the lower cover. Apart from this type, a structure in which, a hole for the shaft receiver is formed in the upper cover and the lower cover is common. Even in a case in which, the shaft receiver is a hole, a problem similar to the abovementioned problem arises.

The present invention has been made in view of the abovementioned circumstances, and an object of the present invention is to change a mounting arrangement of a rotating shaft of the diaphragm plate, and to provide a light adjusting apparatus which is easy to assemble and which can be used in a small-size image pickup equipment.

To solve the abovementioned problems and to achieve the object, according to the present invention, there is provided a light adjusting apparatus including two substrates, out of which, at least one has an aperture, a spacing portion which regulates a distance between the two substrates, at least one incident-light adjusting unit which has a shaft member which becomes a center of rotation, and which is turned (pivoted) in a plane perpendicular to an optical axial direction, between the substrates, and at least one driving unit which drives the incident-light adjusting unit, and incident light which passes through the aperture is adjusted by turning the incident-light adjusting unit alternately to the aperture and to a retracted position which is retracted from the aperture, by the driving unit, and the light adjusting apparatus includes a notch which receives the shaft member, formed in the substrate, and a retaining portion which prevents the incident-light adjusting unit from dropping.

Moreover, according to a preferable aspect of the present invention, it is desirable that the two substrates and the spacing member are made of a single member which is made by a single stacking process and/or a molding process.

Furthermore, according to a preferable aspect of the present invention, it is desirable that the notch and the shaft member are in contact at least at two points.

According to a preferable aspect of the present invention, it is desirable that a part of the retaining portion and a part of the notch which receives the shaft member form a circular arc shape.

Moreover, according to a preferable aspect of the present invention, it is desirable that the retaining portion makes a contact at least at one point of the shaft member or the incident-light adjusting unit.

Furthermore, according to a preferable aspect of the present invention, it is desirable that the retaining member is made of a separate member which differs from the two substrates and the spacing portion.

According to a preferable aspect of the present invention, it is desirable that a projection and a recess are provided to the two substrates and the retaining portion respectively, and the two substrates and the retaining portion are joined.

Moreover, according to a preferable aspect of the present invention, it is desirable that the spacing portion and the retaining portion are joined by sticking the retaining portion to the spacing portion.

Furthermore, according to a preferable aspect of the present invention, it is desirable that a stage equivalent to a thickness of the retaining portion is formed on the spacing portion.

According to a preferable aspect of the present invention, it is desirable that the retaining portion is the same member as the substrate and the spacing portion.

Moreover, according to a preferable aspect of the present invention, it is desirable that the retaining portion is made of a protruding portion which is formed on a side surface of the notch which receives the rotating shaft.

Furthermore, according to a preferable aspect of the present invention, it is desirable that the incident-light adjusting units are provided in plurality.

According to a preferable aspect of the present invention, it is desirable that all incident-light adjusting units are held by a single retaining portion.

Moreover, according to a preferable aspect of the present invention, it is desirable that the upper substrate is formed to have a diameter smaller than a diameter of the lower substrate, roughly by an amount of width of the retaining portion.

Furthermore, according to a preferable aspect of the present invention, it is desirable that an aperture having a diameter different from a diameter of the aperture formed in the substrate is formed in the incident-light adjusting unit.

According to a preferable aspect of the present invention, it is desirable that an optical lens is formed in the incident-light adjusting unit.

Moreover, according to a preferable aspect of the present invention, it is desirable that an optical filter is formed in the incident-light adjusting unit.

Furthermore, according to a preferable aspect of the present invention, it is desirable that the driving unit includes a magnet which is joined to the incident-light adjusting unit, and a coil in which, a coil wire is wound around a core material.

The light adjusting apparatus according to the present invention shows an effect that since the light adjusting apparatus is assembled by providing a notch which receives the shaft member, to the substrate, assembling becomes easy.

DETAILED DESCRIPTION OF THE PREFERRED EMBODIMENTS

Exemplary embodiments of a light adjusting apparatus according to the present invention will be described below in detail by referring to the accompanying diagrams. However, the present invention is not restricted to the embodiments described below.

First Embodiment

A light adjusting apparatus according to a first embodiment of the present invention is a variable aperture which regulates an amount of light which passes through an aperture, by displacing a diaphragm plate in which the aperture is formed to a position in an optical path and a position away from the optical path alternately. Moreover, an arrangement is let to be such that the diaphragm plate is driven by using an electromagnetic actuator.

Figure 1:
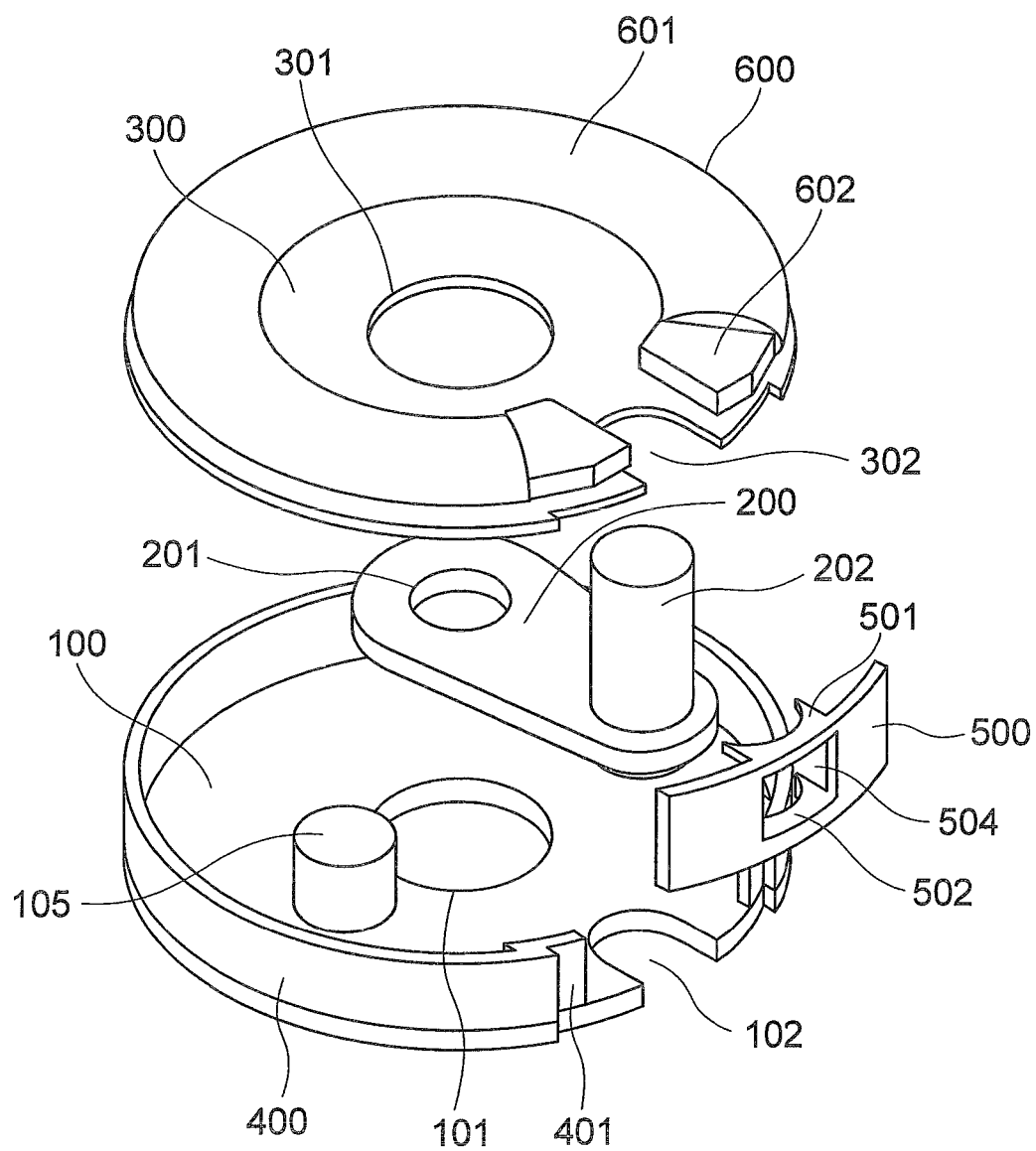
FIG. 1 is an exploded perspective view of a variable aperture according to a first embodiment of the present invention.
Figure 2:
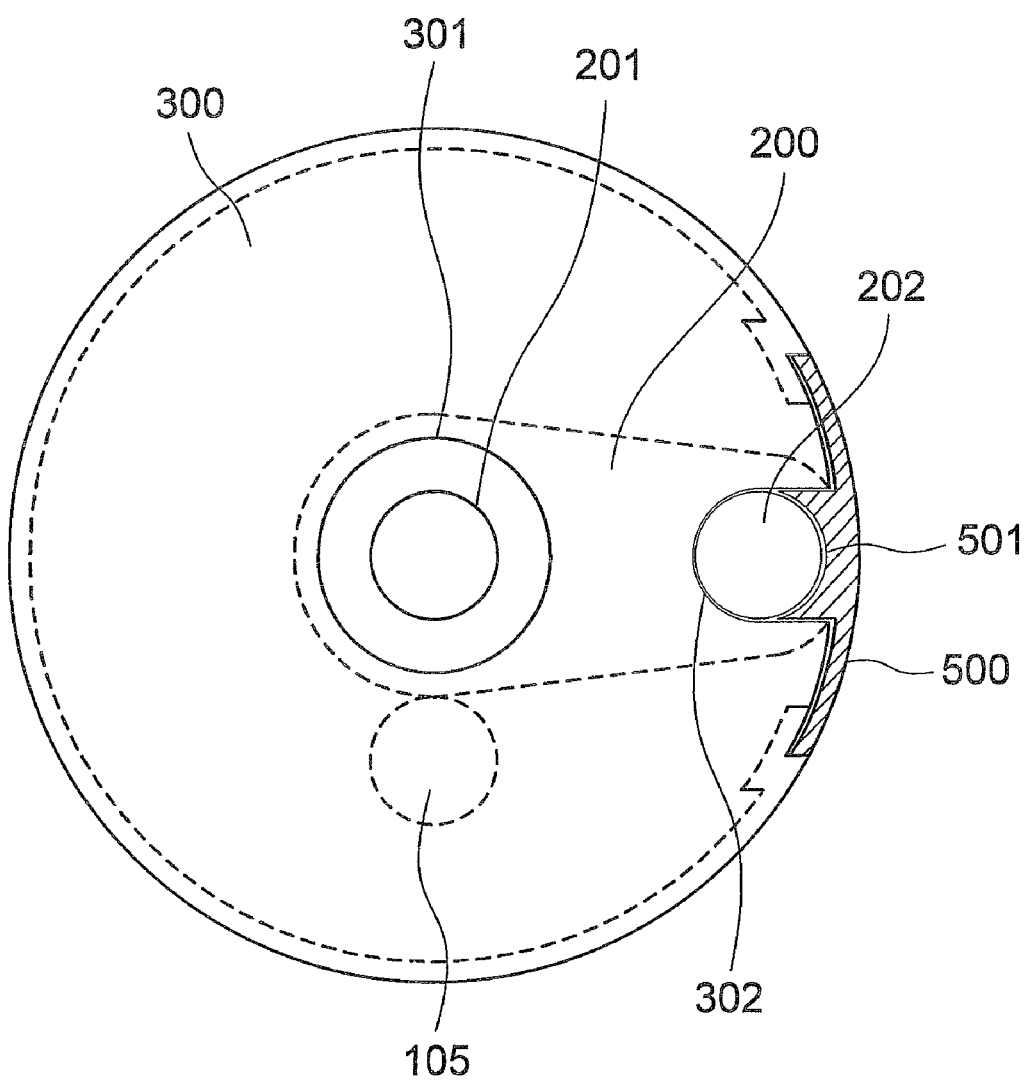
FIG. 2 is a top view of the first embodiment.

FIG. 1 is an exploded perspective view of the variable aperture in the light adjusting apparatus according to the first embodiment. FIG. 2 shows a top view excluding a coil, in the variable aperture shown in FIG. 1.

As shown in FIG. 1 and FIG. 2, the variable aperture according to the first embodiment includes a lower substrate 100, a diaphragm plate 200 to which a shaft member 202 is joined, an upper substrate 300, a spacing member 400, a shaft receiving member 500, and a coil 600. In all the embodiments which follow, the diaphragm plate 200 corresponds to an incident-light adjusting unit, the spacing member 400 corresponds to a spacing portion, the shaft member 202 and the coil 600 correspond to a driving unit, and the shaft receiving ember 500 corresponds to a retaining portion.

A first aperture 101, a positioning portion 105, and a notch 102 for receiving shaft are formed in the lower substrate 100. A second aperture 201 is formed in the diaphragm plate 200, and the shaft member 202 made of a circular cylindrical shaped magnet is joined to the diaphragm plate 200. A third aperture 301 and a notch 302 for receiving shaft are formed in the upper substrate 300. Shaft receiving portions 501 and 502, and a window 504 are formed in the shaft receiving member 500. The coil 600 is a structure in which, a coil wire 601 is wound around a core material 602.

Details of each structural member will be described below.

The first aperture 101 and the notch 102 for receiving shaft are formed in the lower substrate 100, and the third aperture 301 and the notch 302 for receiving shaft are formed in the upper substrate 300. Centers of the first aperture 101 and the third aperture 301 are let to be an optical axis, and the optical axis is an optical path through which, incident light passes. The first aperture 101 and the third aperture 301 are formed such that a diameter of the first aperture 101 and a diameter of the third aperture 301 are let to be same or different. The diameter of the aperture is a diameter of an open aperture in the variable aperture. When the diameter of the first aperture 101 and the diameter of the third aperture 301 are different, the smaller diameter of the aperture becomes the diameter of the open aperture.

The notch 102 for receiving shaft is cut from an outer peripheral portion of the lower substrate 100 toward the centers of the first aperture 101, and the notch 302 for receiving shaft is cut from an outer peripheral portion of the upper substrate 300 toward the third aperture 301. A deepest portion of the notch is formed to be circular-arc shaped having a diameter almost same as a diameter of the shaft member 202. Moreover, the positioning portion 105 is formed in the lower substrate 100.

The spacing member 400 is a member which regulates a distance between the lower substrate 100 and the upper substrate 300, and relative positions of the lower substrate 100 and the upper substrate 300. Furthermore, the spacing member 400 is discontinuous near the notch 102 for receiving shaft formed in the lower substrate 100 and the notch 302 for receiving shaft formed in the upper substrate 300. A stage portion 401 in a direction toward center is provided at an end portion of the spacing member 400.

The shaft receiving portions 501 and 502 having a circular arc shape of a diameter almost same as the diameter of the shaft member 202 are formed at a substantially central portion of the shaft receiving member 500. As shown in FIG. 2, two end-portions of the shaft receiving member 500 are joined to the stage portion 401 of the spacing member 400 by an adhesive. In this joined state, an area of a circular arc shaped portion of the notch 102 for receiving shaft, a circular arc shaped portion of the notch 302 for receiving shaft, and a circular arc shaped portion of the shaft receiving portions 501 and 502 has a substantially circular shape with a diameter almost same as the diameter of the shaft member 202.

In such manner, by joining the two end-portions of the shaft receiving member 500 and the stage portion 401 of the spacing member 400, the variable aperture is formed without an outer shape of the variable aperture being protruded. Moreover, the window 504 is formed at the substantially central portion of the shaft receiving member 500. The window 504 has been formed for preventing interference with the diaphragm plate 200, and by adopting such structure, it is possible reduce further external dimensions of the variable aperture.

The second aperture 201 which is smaller than the first aperture 101 formed in the lower substrate 100 and the third aperture 301 formed in the upper substrate 300, is formed in the diaphragm plate 200. Moreover, the shaft member 202 made of the circular cylindrical shaped magnet is joined to the diaphragm plate 200 by a method such as press fitting. The shaft member 202 is fitted into substantially circular shaped area which is formed by the notch 102 for receiving shaft formed in the lower substrate 100 and the notch 302 for receiving shaft formed in the upper substrate 300, and the shaft receiving portions 502 and 501 which are formed in the shaft receiving members 500. The diaphragm plate 200 is pivotably installed with the shaft member 202 as an axis of rotation. An area in which the diaphragm plate 200 moves, in an optical axial direction, is regulated by the lower substrate 100 and the upper substrate 300, and an area in which the diaphragm plate 200 moves, in a direction of rotation is regulated by the positioning portion 105 and the spacing member 400.

The diaphragm plate 200 is formed (arranged) such that, at a position at which the diaphragm plate 200 makes a contact with the positioning portion 105, the center of the second aperture 201 coincides with the optical axis.

The coil 600 includes the core material 602 made of a magnetic material such as permalloy and silicon steel around which the coil wire 601 is wound, and two end-portions of the core material 602 are formed (arranged) to be facing the shaft member 202 which has been joined to the diaphragm plate 200.

As a method for forming each member, the lower substrate 100, the upper substrate 300, and the spacing member 400 may be formed by a machining process such as pressing a thin sheet made of a non-magnetic substance such as phosphor bronze, beryllium copper, and a resin material, and joining by an adhesive, or may be formed as an integrated member by a metal MEMS technology or an injection molding technology which includes a series of staking (laminating) processes by plating and etching.

Next, an operation of the variable aperture according to the first embodiment will be described below.

The shaft member 202 which is joined to the diaphragm plate 200 is made of the circular cylindrical shaped magnet, and is magnetized such that an S-polarity and an N-polarity are in the optical axial direction from the center of the second aperture 201 formed in the diaphragm plate 200 toward the shaft member 202. On the other hand, the coil 600 includes the coil wire 601 wound around the core material 602 made of a magnetic material such as permalloy and silicon steel, and by an electric current which flows through the coil wire 601, two end-portions of the core material 602 are magnetized to the S-polarity and the N-polarity. By forces of magnetic attraction and repulsion which are generated between a magnetic field generated by the coil 600 and a magnetic field of the shaft member 202, a rotational force is generated in the shaft member 202, and the diaphragm plate 200 is turned (is pivoted) with the shaft member 202 as a center of rotation. It is possible to control a direction of rotation by controlling a direction of the electric current which flows through the coil wire 601.

Here, a case in which, a rotational force in a counterclockwise direction in the diagram is exerted to the diaphragm plate 200 will be taken into consideration. The diaphragm plate 200 stops at a position where it has made a contact with the positioning portion 105. The diaphragm plate 200 closes the first aperture 101 and the third aperture 301. By the center of the second aperture 202 formed in the diaphragm plate 200 coinciding with the optical axis, the second aperture 201 becomes the diameter of the optical path through which the incident light passes.

Moreover, a case in which, a rotational force in a clockwise direction in the diagram is exerted to the diaphragm plate 200 will be taken into consideration. The diaphragm plate 200 stops at a position where it has made a contact with the spacing member 400. The diaphragm plate 200 is retracted from the first aperture 101 and the third aperture 301, and the first aperture 101 and the third aperture 301 become the aperture diameter.

In such manner, it is possible to control in two stages, the diameter of the optical path through which the incident light passes.

Next, an effect of the variable aperture according to the first embodiment will be described below. As a process of assembling the variable aperture of the first embodiment, firstly, a mechanism member which includes the lower substrate 100, the upper substrate 300, and the spacing member 400 is formed. Thereafter, the diaphragm plate 200 is inserted between the lower substrate 100 and the upper substrate 300, through the discontinuous portion of the spacing member 400, and the shaft member 202 is fitted into the notch 102 for receiving shaft and the notch 302 for receiving shaft. Finally, the shaft receiving member 500 is joined.

In such manner, since the variable aperture is assembled by fitting into the notch 102 for receiving shaft and the notch 302 for receiving shaft finally, there is no need any more of joining the lower substrate 100 and the upper substrate 300 in a state of the shaft member 202 and the shaft receiving hole being positioned, and it is possible to carry out the assembling easily.

Moreover, as it has hitherto been done, in a structure in which the shaft member 202 is to be inserted into the shaft receiving hole, it is not possible to adopt a molding technique in which, the lower substrate 100, the upper substrate 300, and the spacing member 400 are molded integrally by using the metal MEMS technology or the injection molding technology. By letting the structure to be the structure according to the abovementioned proposal, it is possible to introduce such method of molding.

Furthermore, in a case of molding integrally the lower substrate 100, the upper substrate 300, and the spacing member 400 by using the metal MEMS technology or the injection molding technology, it is possible to have a high accuracy of relative positions of the notch 102 for receiving shaft which is formed in the lower substrate 100 and the notch 302 for receiving shaft which is formed in the upper substrate 300.

According to the method which has hitherto been used, when there is a shift in relative positions of receiving shaft of an upper cover and a lower cover due to an assembling tolerance, there has been a problem that the rotation of the shaft is obstructed. Therefore, it was necessary to position the upper substrate and the lower substrate with a high accuracy. Whereas, according to the first embodiment, it is also possible to reduce defective rotation of the shaft member 202 which is due to such shift in the assembling tolerance.

Moreover, in the first embodiment, by making an arrangement such that the shaft receiving member 500 for preventing dropping of the shaft member 202 is let to be a separate member, and the diaphragm plate 200 is inserted from behind, it is also possible to select a method for molding the shaft receiving member 500 and the diaphragm plate 200 which is different from a method for the main body, a degree of freedom for molding becomes higher.

Figure 3:
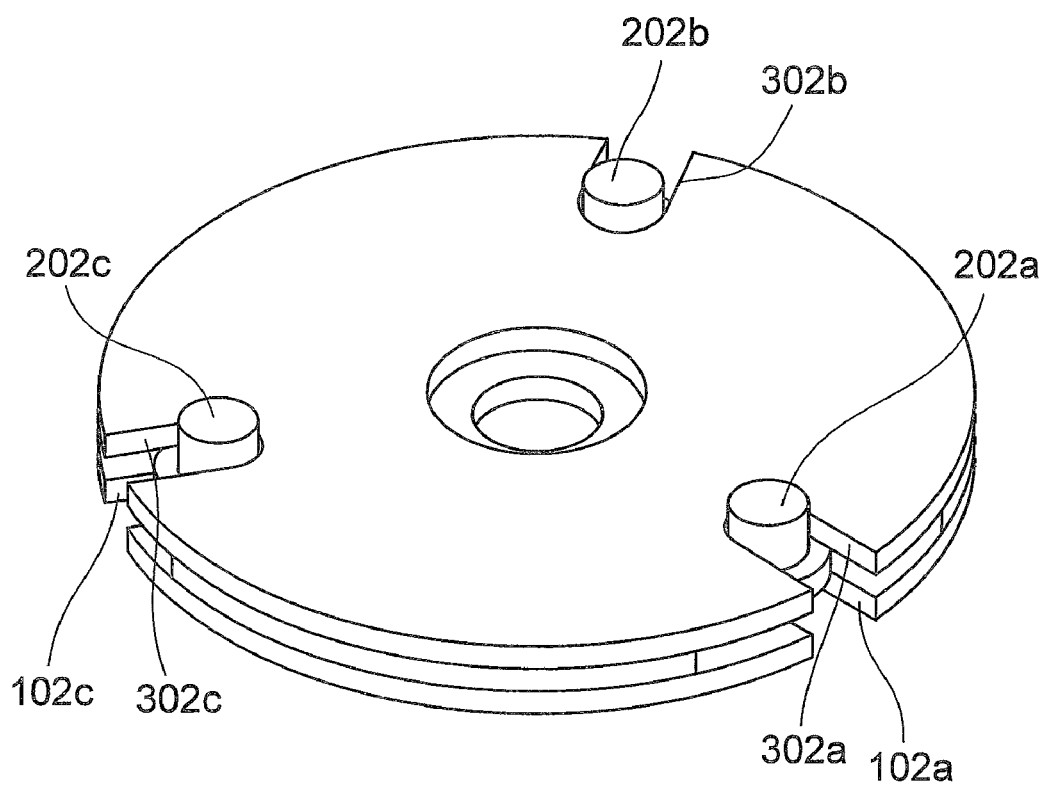
FIG. 3 is a diagram showing a structure according to a modified embodiment of the first embodiment.

FIG. 3 is a diagram showing a structure according to a modified embodiment of the first embodiment. In the modified embodiment of the first embodiment, a structure which includes three diaphragm plates will be described. As shown in FIG. 3, three notches 102a, 102b, and 102c for receiving shaft are formed in a lower substrate 100 (the notch 102b for receiving shaft is not shown in the diagram) and three notches 302a, 302b, and 302c for receiving shaft are formed in an upper substrate 300, and by inserting shaft members 202a, 202b, and 202c which are joined to diaphragm plates (not shown in the diagram) in the respective notches 102a, 302a, 102b, 302b, and 102c and 302d, the structure is let to have three diaphragm plates.

In such manner, by using the plurality of diaphragm plates, it is possible to apply also to a multi-stage diaphragm which realizes a plurality of different aperture diameters.

Moreover, by replacing the diaphragm plate of the modified embodiment of the first embodiment by an optical lens, it is also possible to use as an optical lens detaching (detachable) apparatus.

Furthermore, by replacing the diaphragm plate of the modified embodiment of the first embodiment by an optical filter, it is also possible to use as an optical filter detaching (detachable) apparatus which changes a transmission-light amount or a pass wavelength band.

Second Embodiment

Next, a light adjusting apparatus according to a second embodiment of the present invention will be described below. Same reference numerals are assigned to members (portions) which are same as in the first embodiment and the modified embodiment of the first embodiment, and repetitive description will be omitted.

Figure 4:
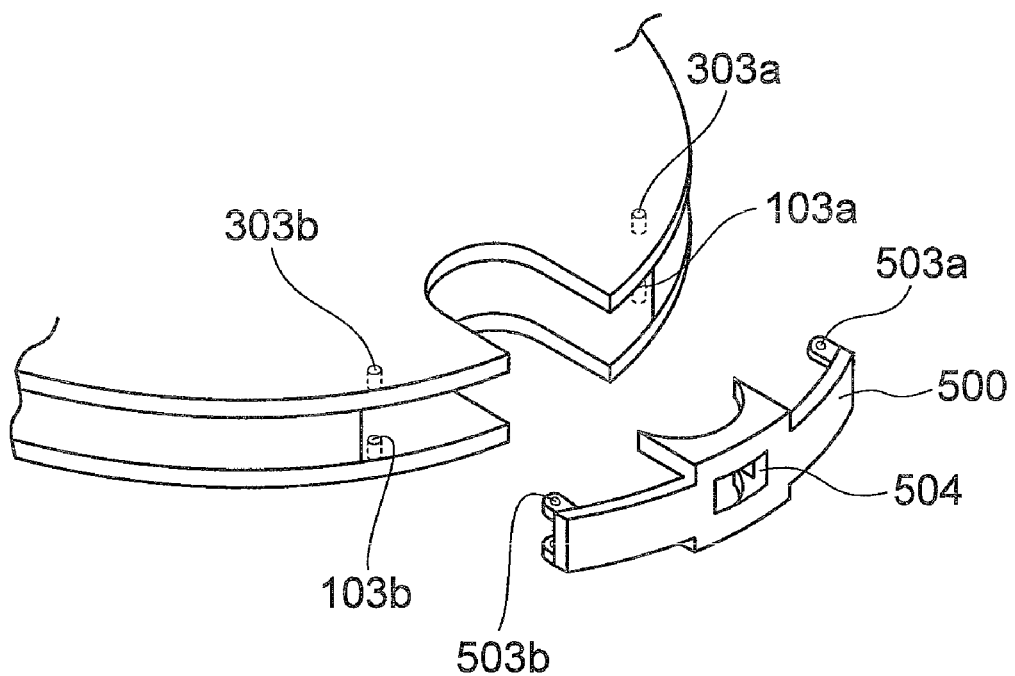
FIG. 4 is a diagram showing a structure of a shaft receiving member according to a second embodiment of the present invention.

FIG. 4 shows a perspective view of a shaft receiving member 500 and a part of an upper substrate 300 and a part of a lower substrate 100 of a variable aperture according to the second embodiment.

As shown in FIG. 4, in the variable aperture according to the second embodiment, unlike in the first embodiment, projections for joining 503a, 503b, 503d, and 503e (projections for joining 503d and 503e are not shown in the diagram) are formed in the shaft receiving member 500. Moreover, projection receiving holes 103a and 103b are formed in the lower substrate 100 and projection receiving holes 303a and 303b are formed in the upper substrate 300.

The projections for joining 503a, 503b, 503d, and 503e and the projection receiving holes 303a, 303b, 103a, and 103b are formed at positions such that the projections for joining 503a, 503b, 503d, and 503e fit in the projection receiving holes 303a, 303b, 103a, and 103b respectively at the time of joining the shaft receiving member 500. By fitting the projections for joining 503a, 503b, 503d, and 503e into the projection receiving holes 303a, 303b, 103a, and 103b respectively, the shaft receiving member 500, and the lower substrate 100 and the upper substrate 300 are joined.

According to the second embodiment, since the shaft receiving member 500 is assembled only by fitting upon forming the projections for joining on the shaft receiving member, and forming the projection receiving holes in the upper substrate and the lower substrate, there is no need to stick at the time of joining, and it is possible to carry out assembling more easily.

It is needless to mention that the projections for joining 503a, 503b, 503d, and 503e may be formed on the upper substrate 300 and the lower substrate 100 respectively, and the projection receiving holes 303a, 303b, 103a, and 103b may be formed in the shaft receiving member 500.

Third Embodiment

Next, a third embodiment of the present invention will be described below by referring to FIG. 5. Same reference numerals are assigned to members which are same as in the first embodiment, the modified embodiment of the first embodiment, and the second embodiment, and repetitive description will be omitted.

Figure 5:
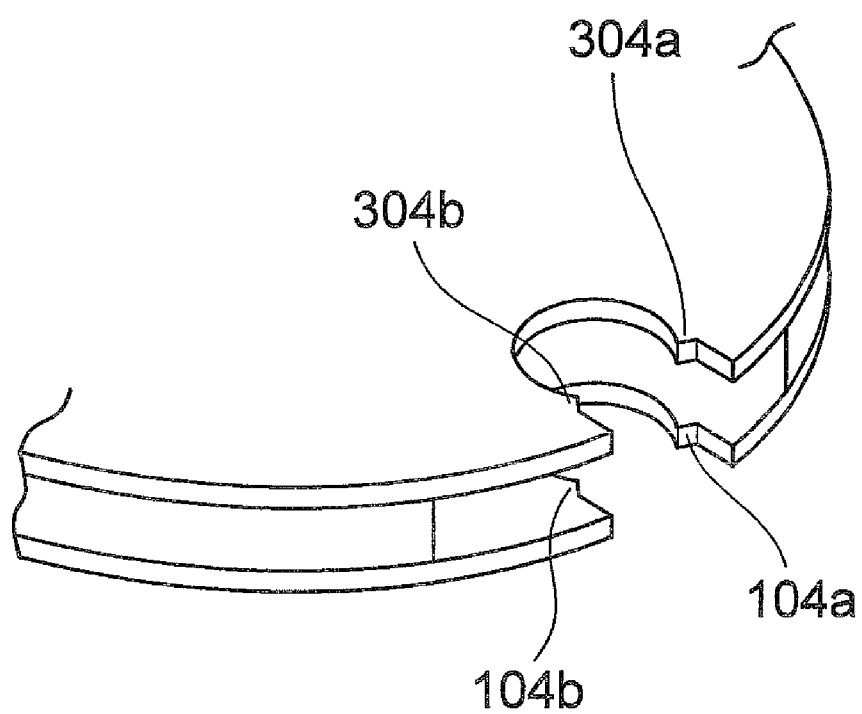
FIG. 5 is a diagram showing a structure of a shaft receiving member according to a third embodiment of the present invention.

FIG. 5 shows a perspective view in which a part of an upper substrate and a part of a lower substrate of a variable aperture according to the third embodiment are shown. As shown in FIG. 5, the variable aperture according to the third embodiment differs from the variable apertures according to the first embodiment and the second embodiment at a point that protruding portions 104a and 104b are formed on a lower substrate 100, and protruding portions 304a and 304b are formed on an upper substrate 300, instead of forming on the shaft receiving portion 500.

Figure 6:
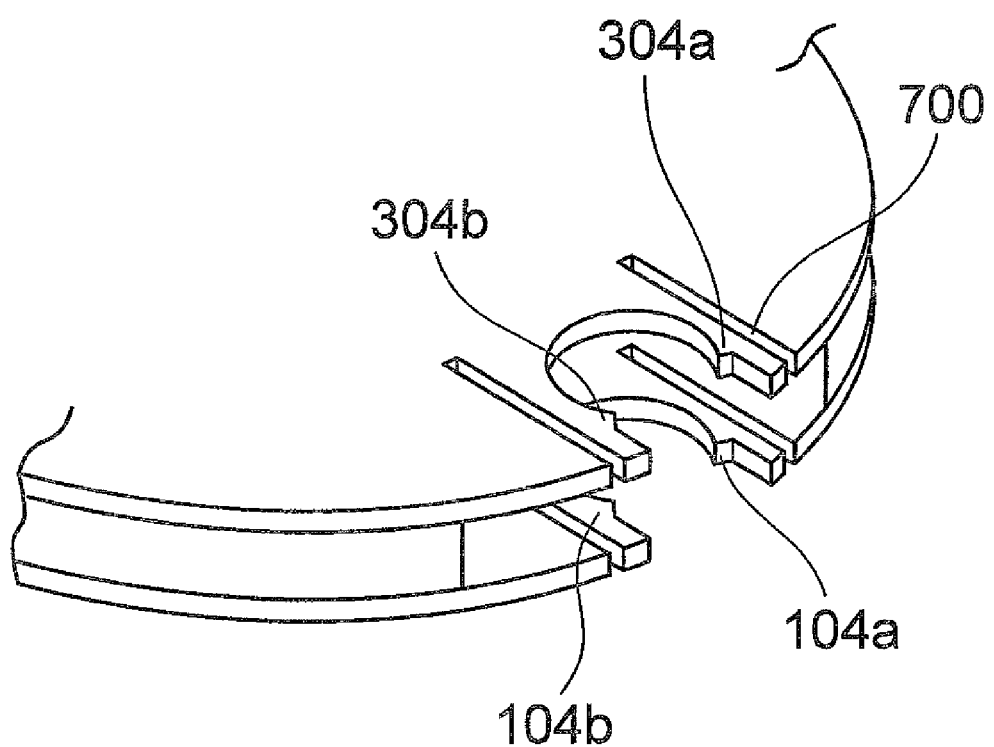
FIG. 6 is a diagram showing a structure of a shaft receiving member according to a modified embodiment of the third embodiment.

An outer peripheral portion side of the lower substrate 100 which is on an outer side of a portion of the lower substrate 100 on which the protruding portions 104a and 104b are formed, and an outer peripheral portion side of the upper substrate 300 which is on an outer side of a portion of the upper substrate 300 on which the protruding portions 304a and 304b are formed are formed to be curved so that a shaft member 202 can be inserted. Moreover, a central side of the lower substrate 100, which is more toward the center than the portion on which the protruding portions 104a and 104b are formed, and a central side of the upper substrate 300, which is more toward the center than the portion on which the protruding portions 304a and 304b are formed are formed to be substantially circular shaped so that the shaft member 202 is turnable. Moreover, for carrying out the insertion of the shaft member 202 easily, a slit 700 may be provided on both sides of the notch 102 for receiving shaft in the lower substrate 100 and the notch 302 for receiving shaft in the upper substrate 300 as shown in FIG. 6. In such manner, by providing the protruding portions 104a and 104b at positions of the notch 102 for receiving shaft of the lower substrate 100, and the protruding portions 304a and 304b at positions of the notch 302 for receiving shaft of the upper substrate 300, it is possible to prevent dropping of the shaft member 202 without providing the shaft receiving member 500 separately, and to hold the shaft member 202 turnably. Consequently, it is possible to carry out assembling more easily.

Fourth Embodiment

A fourth embodiment of the present invention will be described below by using FIG. 7A, FIG. 7B, and FIG. 7C and FIG. 8A, FIG. 8B, and FIG. 8C.

Figure 7A:
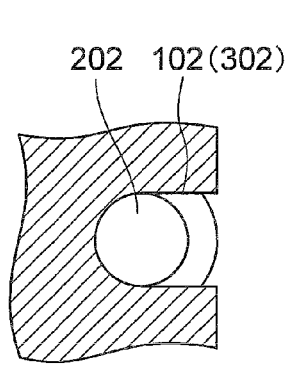
FIG. 7A, FIG. 7B, and FIG. 7C are diagrams, each showing a shaft member and a notch for receiving shaft of a light adjusting apparatus according to a fourth embodiment of the present invention.
Figure 7B:
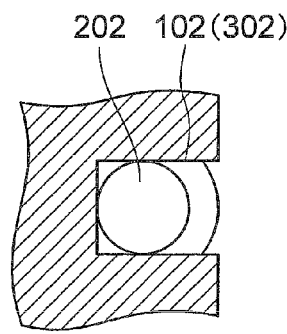
Figure 7C:
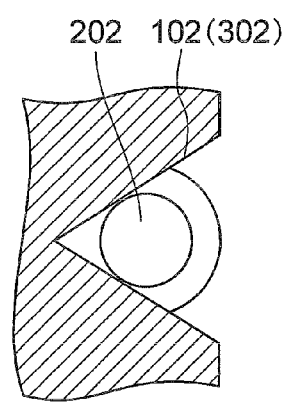

FIG. 7A, FIG. 7B, and FIG. 7C are diagrams, each showing a shaft member and a notch for receiving shaft of a light adjusting apparatus according to the fourth embodiment of the present invention.

A notch 102 for receiving shaft becomes a guide which regulates rotation of a shaft member 202 functionally. Therefore, the notch 102 for receiving shaft is required to have at least two contact points with respect to the shaft member 202. In this case, the contact point does not mean a point where the notch 102 for receiving shaft and the shaft member 202 come in contact at an arbitrary moment, but means a point where the notch 102 for receiving shaft and the shaft member 202 come in contact functionally.

For instance, by forming the notch 102 for receiving shaft on a circular arc as shown in FIG. 7A, the notch 102 for receiving shaft and the shaft member 202 have infinite number of contact points. Similarly, by forming the notch 102 receiving shaft as shown in FIG. 7B, the notch 102 for receiving shaft and the shaft member 202 have three contact points. Moreover, by forming the notch 102 for receiving shaft as shown in FIG. 7C, the notch 102 for receiving shaft and the shaft member 202 have two contact points.

FIG. 8A, FIG. 8B, FIG. 8C, and FIG. 8D are diagrams, each showing a shaft receiving member and a shaft member or a diaphragm plate of the light adjusting apparatus according to the fourth embodiment.

A shaft receiving member 500 prevents falling of a diaphragm plate 200 functionally, as well as regulates rotation of a shaft member 202 and the diaphragm plate, together with a notch 102 for receiving shaft. Therefore, the shaft receiving member 500 is required to have at least one contact point with the shaft member 202 or the diaphragm plate 200.

The contact point in this case, does not mean a point where the shaft receiving member 500 and the shaft member 202 or the diaphragm plate 200 come in contact at an arbitrary movement, but means a point where the shaft receiving member 500 and the shaft member 202 or the diaphragm plate 200 come in contact functionally.

Figures 8A, 8B, 8C, 8D:
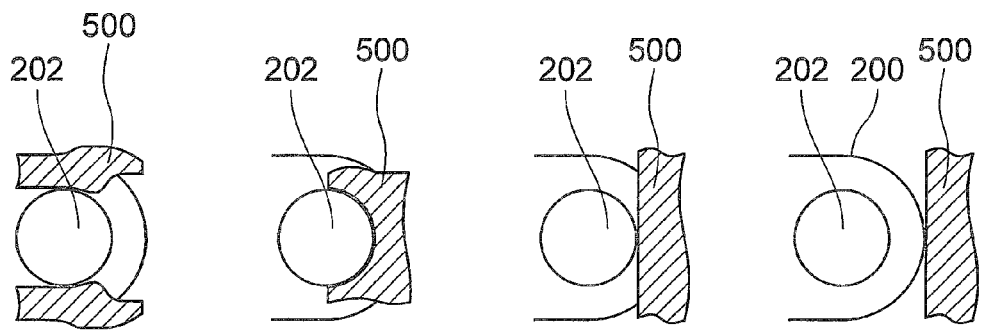
FIG. 8A, FIG. 8B, FIG. 8C, and FIG. 8D are diagrams, each showing a shaft receiving member and a shaft member or a diaphragm plate of the light adjusting apparatus according to the fourth embodiment.

For instance, by forming protruding portions 304a and 304b, which become a shaft receiving member 500, on a side surface of the notch 102 for receiving shaft as shown in FIG. 8A, the shaft receiving member 500 and the shaft member 202 have two contact points. Similarly, by forming a shaft receiving member 500 as shown in FIG. 8B, the shaft receiving member 500 and the shaft member 202 have infinite number of contact points. By forming a shaft receiving member 500 as shown in FIG. 8C, the shaft receiving member 500 and the shaft member 202 have one contact point. Moreover, by forming a location at which, a diaphragm plate 200 makes a contact with a shaft receiving member 500, to be circular arc shaped having a center same as a center of a shaft member 202, and by forming the shaft receiving member 500 as shown in FIG. 8D, the shaft receiving member 500 and the diaphragm plate 200 have one contact point.

As it has been described above, by making an arrangement such that the notch 102 for receiving shaft has at least two contact points with the shaft member 202, and the shaft receiving member 500 has at least one contact point with the shaft member 202 or the diaphragm plate 200, the notch 102 for receiving shaft and the shaft receiving member 500 have at least three contact points with the shaft member 202 or the diaphragm plate 200, and rotation of the shaft member 202 or the diaphragm plate 200 is regulated.

Additional Fifth Embodiment

A fifth embodiment of the present invention will be described below by using FIG. 9 and FIG. 10.

Figure 9:
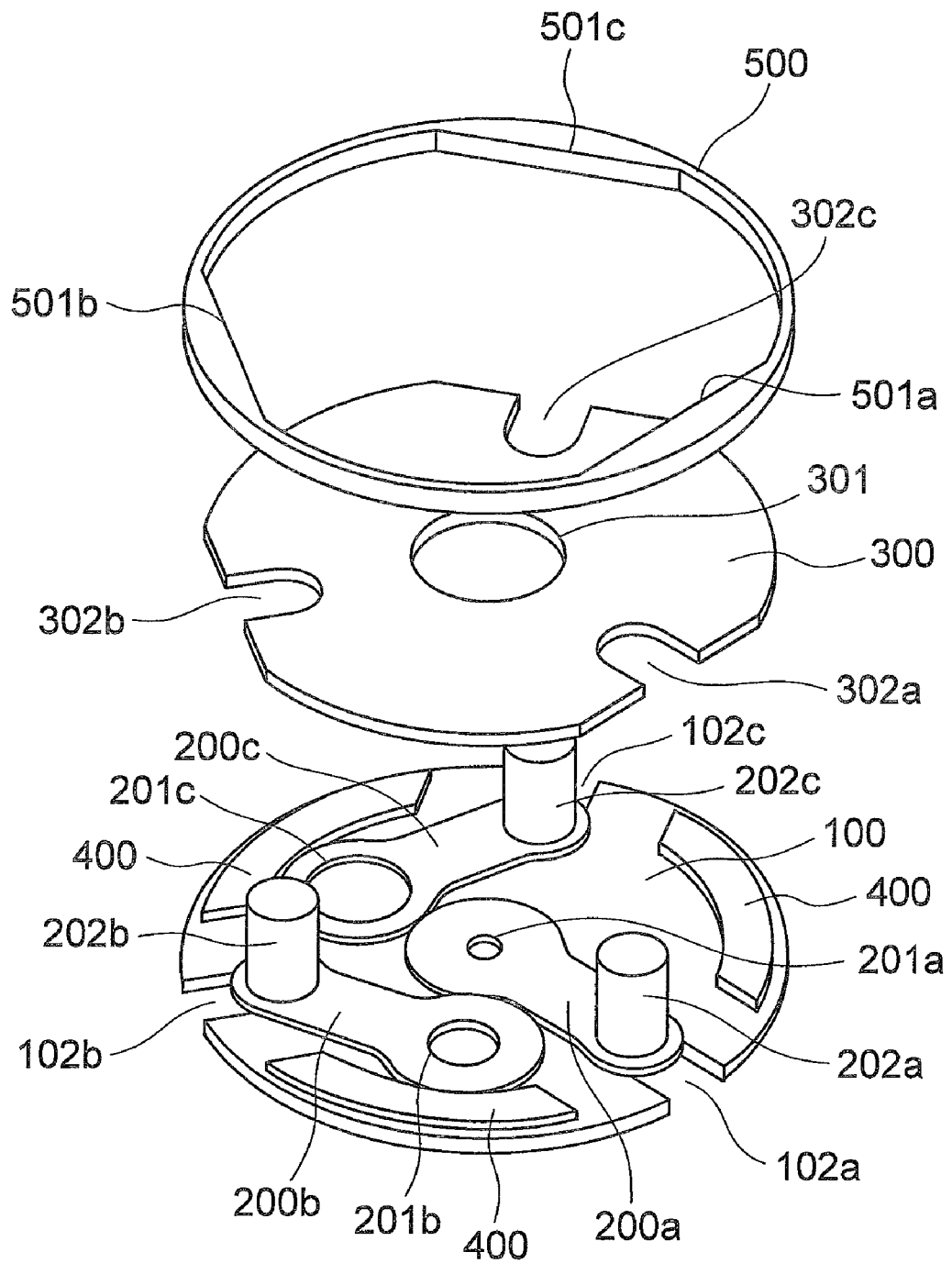
FIG. 9 is an exploded perspective view of a light adjusting apparatus of with a variable aperture according to a fifth embodiment of the present invention.

FIG. 9 shows an exploded perspective view of a light adjusting apparatus according to the fifth embodiment. FIG. 10 shows a top view of the light adjusting apparatus according to the fifth embodiment.

Figure 10:
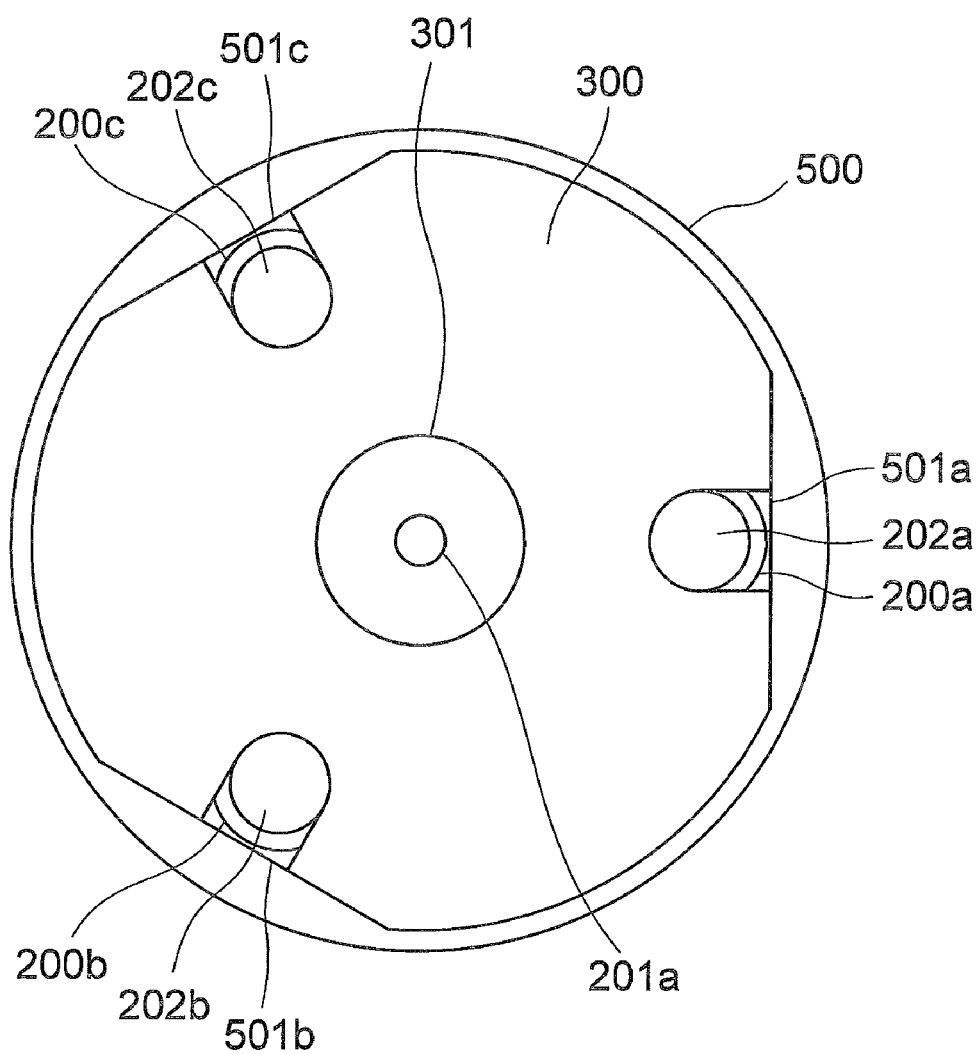
FIG. 10 is a top view of the light adjusting apparatus of with the variable aperture according to the fifth embodiment.

As shown in FIG. 9 and FIG. 10, the light adjusting apparatus according to the fifth embodiment has an upper substrate 300 and a spacing member 400 formed to have a diameter smaller than an outer diameter of a lower substrate 100, on the lower substrate 100. A periphery of each of portions where shaft members 202a, 202b, and 202c of diaphragm plates 200a, 200b, and 200c are joined is formed to be circular arc shaped having a center same as a center of the shaft members 202a, 202b, and 202c.

Moreover, a shaft receiving member 500 has shaft receiving portions 501a, 501b, and 501c coupled together, forming a ring shape. An inner diameter of the shaft receiving member 500 is substantially same as an outer diameter of the spacing member 400 and the upper substrate 300. Moreover, an outer diameter of the shaft receiving member 500 is substantially same as an outer diameter of the lower substrate 100. A thickness of the shaft receiving member 500 is substantially same as a total thickness of the spacing member 400 and the upper substrate 300.

Here, after the lower substrate 100, the spacing member 400, and the upper substrate 300 are joined or formed integrally, diaphragm blades 200a, 200b, and 200c are inserted between the upper substrate 300 and the lower substrate 100. Moreover, the shaft members 202a, 202b, and 202c are fitted into a notches 202a and 302a for receiving shaft, notches 202b and 302b for receiving shaft, and notches 202c and 302c for receiving shaft respectively, which are formed in the upper substrate 300 and the lower substrate 100.

Thereafter, the shaft member 500 formed to be ring-shaped is joined. At the time of joining the shaft member 500, the circular arc portions of the diaphragm plates 200a, 200b, and 200c at a periphery where the shaft members 202a, 202b, and 202c are joined make a contact with the shaft receiving portions 501a, 501b, and 501c.

In the embodiments described above, an arrangement is made such that the diaphragm blades and the shaft receiving members (retaining portions) correspond by a relation of one-to-one. Whereas, in the fifth embodiment, even in a case of a plurality of diaphragm blades, an arrangement can be made with one retaining portion.

In such manner, by forming the light adjusting apparatus as in the fifth embodiment, even in a case of having the plurality of diaphragm blades, it is possible to prevent dropping of the diaphragm blades by a single shaft receiving member. Accordingly, it is possible to carry out assembling easily.

As it has been described above, the light adjusting apparatus according to the present invention is useful for a light adjusting apparatus which adjusts incident light passing through an aperture, and particularly is suitable for a light adjusting apparatus in which, small-sizing is sought.

What is claimed is:

1. A light adjusting apparatus comprising:
two substrates, out of which at least one has an aperture;
a spacing portion which regulates a distance between the two substrates;
at least one incident-light adjusting unit which has a shaft member which becomes a center of rotation, and which is turned in a plane perpendicular to an optical axial direction, between the substrates; and
at least one driving unit which drives the incident-light adjusting unit, wherein
incident light which passes through the aperture is adjusted by turning the incident-light adjusting unit alternately to the aperture and to a retracted position which is retracted from the aperture, by the driving unit, and
the light adjusting apparatus comprising:
a notch which receives the shaft member, formed in the substrate; and
a retaining portion which prevents the incident-light adjusting unit from dropping.

2. The light adjusting apparatus according to claim 1, wherein the two substrates and the spacing portion are made of a single member which is made by a single stacking process and/or a molding process.

3. The light adjusting apparatus according to claim 1, wherein the notch and the shaft member are in contact at least at two points.

4. The light adjusting apparatus according to claim 1, wherein a part of the retaining portion and a part of the notch which receives the shaft member form a circular arc shape.

5. The light adjusting apparatus according to claim 1, wherein the retaining portion makes a contact at least at one point of the shaft member or the incident-light adjusting unit.

6. The light adjusting apparatus according to claim 1, wherein the retaining member is made of a separate member which differs from the two substrates and the spacing portion.

7. The light adjusting apparatus according to claim 6, wherein
a projection and a recess are provided to the two substrates and the retaining portion respectively, and the two substrates and the retaining portion are joined by fitting the projection into the recess.

8. The light adjusting apparatus according to claim 6, wherein the spacing portion and the retaining portion are joined by sticking the retaining portion to the spacing portion.

9. The light adjusting apparatus according to claim 8, wherein a stage equivalent to a thickness of the retaining portion is formed on the spacing portion.

10. The light adjusting apparatus according to claim 1, wherein the retaining portion is the same member as the substrate or the spacing portion.

11. The light adjusting apparatus according to claim 10, wherein the retaining portion is made of a protruding portion which is formed on a side surface of the notch which receives the rotating shaft.

12. The light adjusting apparatus according to claim 1, wherein the incident-light adjusting units are provided in plurality.

13. The light adjusting apparatus according to claim 12, wherein all the incident-light adjusting units are held by a single retaining portion.

14. The light adjusting apparatus according to claim 13, wherein the two substrates are an upper substrate and a lower substrate, the upper substrate is formed to have a diameter smaller than a diameter of the lower substrate, roughly by an amount of width of the retaining portion.

15. The light adjusting apparatus according to claim 1, wherein an aperture having a diameter different from a diameter of the aperture formed in the substrate is formed in the incident-light adjusting unit.

16. The light adjusting apparatus according to claim 1, wherein an optical lens is formed in the incident-light adjusting unit.

17. The light adjusting apparatus according to claim 1, wherein an optical filter is formed in the incident-light adjusting unit.

18. The light adjusting apparatus according to claim 1, wherein the driving unit includes a magnet which is joined to the incident-light adjusting unit, and a coil in which a coil wire is wound around a core material.

* * * * *